United States Patent
Saini et al.

(10) Patent No.: US 11,518,121 B2
(45) Date of Patent: Dec. 6, 2022

(54) CONSTRAINED CREEP FORMING OF CONTOURED COMPOSITE STIFFENERS

(71) Applicant: The Boeing Company, Chicago, IL (US)

(72) Inventors: Gagandeep Saini, Snohomish, WA (US); Lisa Christina Carlson, Auburn, WA (US); Kurtis Shuldberg Willden, Kent, WA (US); Brian James Smith, Bellevue, WA (US); Jonathan Santiago, Seattle, WA (US)

(73) Assignee: The Boeing Company, Chicago, IL (US)

( * ) Notice: Subject to any disclaimer, the term of this patent is extended or adjusted under 35 U.S.C. 154(b) by 462 days.

(21) Appl. No.: 16/600,887

(22) Filed: Oct. 14, 2019

(65) Prior Publication Data

US 2021/0107238 A1    Apr. 15, 2021

(51) Int. Cl.
| | |
|---|---|
| *B29C 70/54* | (2006.01) |
| *B29C 70/46* | (2006.01) |
| *B29K 63/00* | (2006.01) |
| *B29K 307/04* | (2006.01) |

(52) U.S. Cl.
CPC .......... *B29C 70/543* (2013.01); *B29C 70/461* (2021.05); *B29K 2063/00* (2013.01); *B29K 2307/04* (2013.01)

(58) Field of Classification Search
CPC ....... B29C 53/382; B29C 53/40; B29C 70/46; B29C 70/461; B29C 70/462; B29C 70/543; B29K 2063/00; B29K 2307/04
See application file for complete search history.

(56) References Cited

U.S. PATENT DOCUMENTS

| | | |
|---|---|---|
| 5,387,098 A | 2/1995 | Willden |
| 7,527,759 B2 | 5/2009 | Lee et al. |
| 8,465,613 B2 | 6/2013 | Rotter et al. |
| 8,795,567 B2 | 8/2014 | Bland |
| 8,997,642 B2 | 4/2015 | Stewart et al. |
| 9,387,628 B2 | 7/2016 | Chapman et al. |
| 2012/0076973 A1 | 3/2012 | Guzman et al. |
| 2013/0036922 A1 | 2/2013 | Stewart et al. |
| 2014/0087143 A1 | 3/2014 | Pacchione et al. |
| 2017/0095983 A1 | 4/2017 | Offensend et al. |

FOREIGN PATENT DOCUMENTS

| | | |
|---|---|---|
| EP | 2441571 A1 | 4/2012 |
| EP | 3115185 A1 | 1/2017 |

OTHER PUBLICATIONS

European Patent Office Extended Search Report, dated Feb. 24, 2021, regarding Application No. 20200869.4, 9 pages.

(Continued)

*Primary Examiner* — Philip C Tucker
*Assistant Examiner* — Evan T Hulting
(74) *Attorney, Agent, or Firm* — Yee & Associates, P.C.

(57) ABSTRACT

A composite laminate stiffener is formed to contour with reduced ply wrinkling using constrained creep forming. The tooling apparatus is provided with flexible cauls which constrain the stiffener during the contour forming process. The creep forming is carried out at a slow enough rate so that friction or shear resistance between the resin and fibers of the plies remains low enough that slippage can occur and significant compression stresses are not generated rate, allowing relaxation of residual stresses in the stiffener.

20 Claims, 17 Drawing Sheets

(56) References Cited

OTHER PUBLICATIONS

Office Action, dated May 14, 2021, regarding U.S. Appl. No. 16/600,925, 24 pages.
Final Office Action, dated Aug. 11, 2021, regarding U.S. Appl. No. 16/600,925, 14 pages.
Saini et al., "Flexible Caul and Method of Making the Same," U.S. Appl. No. 16/600,925, filed Oct. 14, 2019, 42 pages.
Advisory Action, dated Oct. 14, 2021, regarding U.S. Appl. No. 16/600,925, 6 pages.
Office Action, dated Dec. 27, 2021, regarding U.S. Appl. No. 16/600,925, 15 pages.

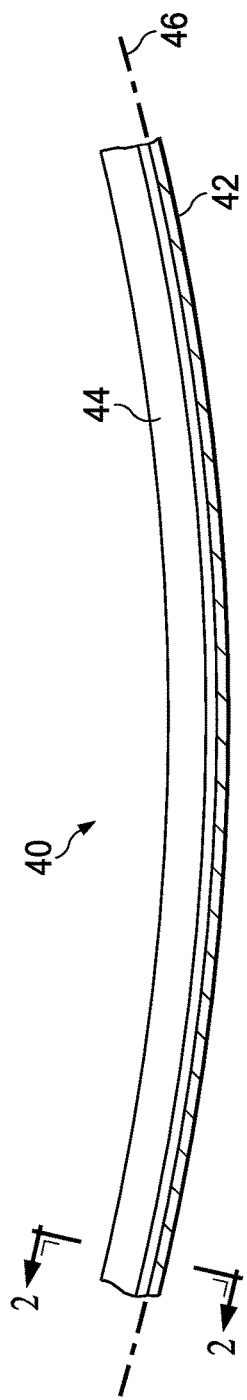
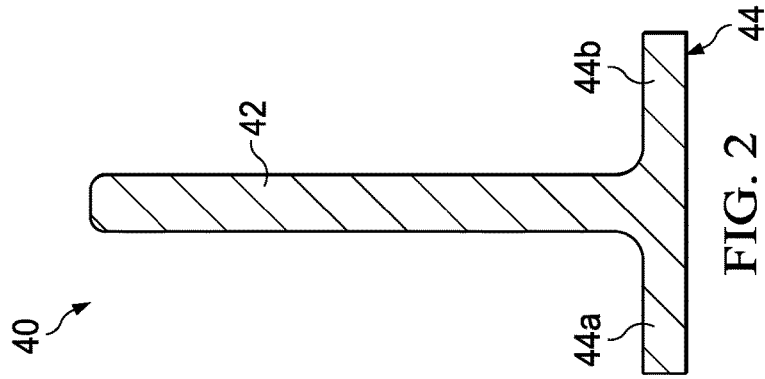

CONSTRAINED CREEP FORMING OF CONTOURED COMPOSITE STIFFENERS

CROSS REFERENCE TO RELATED APPLICATIONS

This application is related to co-pending U.S. patent application Ser. No. 16/600,925, filed concurrently herewith on Oct. 14, 2019, which is incorporated by reference herein in its entirety.

BACKGROUND INFORMATION

1. Field

The present disclosure generally relates to manufacturing of composite parts, and deals more particularly with a method of forming composite laminate stiffeners that are contoured along their length.

2. Background

Composite laminate stiffeners such as stringers are frequently used in the marine, aircraft and other industries to transfer loads. In some applications, the stiffeners may need to be contoured along their lengths in order to conform them to a structure such as a contoured aircraft skin, to which they are to be attached. Difficulty can be encountered in producing highly contoured composite laminate stiffeners because of the tendency of the plies to wrinkle as they are being formed to a desired contour. Ply wrinkling may have undesired effect on the performance of a stiffener. Advancements in production equipment have partially automated the process of making contoured composite laminate stiffeners, however, the elimination of ply wrinkling continues to be a problem.

Accordingly, it would be desirable to provide a method of producing contoured composite laminate parts and structures such as stiffeners that reduces or eliminates ply wrinkling.

SUMMARY

The disclosure relates in general to the production of composite laminate parts, and more specifically to a method of producing contoured composite laminate stiffeners that reduces or substantially eliminates ply wrinkling during the forming process.

According to one aspect, a method is provided of making a contoured composite laminate stiffener. The method includes placing a multi-ply composite charge on a surface of a die having a die cavity, and heating the composite charge. The method also includes producing a partially formed stiffener by forming the composite charge into the die cavity. The method also includes constraining the partially formed stiffener, and creep forming it to a desired contour along its length while it is being constrained in order to reduce or eliminate ply wrinkling during the contour forming process. Forming to the desired contour is performed at a rate that is slow enough such that friction or shear resistance between resin and fibers of the plies remains low enough that slippage can occur and significant compression stresses are not generated According to another aspect, a method is provided of making a contoured fiber-reinforced composite laminate stiffener having reduced wrinkling. The method includes placing a composite charge between an upper die and a lower die having a die cavity, and heating the composite charge. The method further includes producing a stiffener having a desired cross sectional shape by using the upper die to form the composite charge into the die cavity. The method also includes constraining the stiffener by using the upper die and lower die to apply pressure to the stiffener, and forming the stiffener to a contour while it is being constrained by the upper die and the lower die. Forming the stiffener to the contour is performed at a rate that allows relaxation of residual stresses in the stiffener produced by the contouring process.

According to still another aspect, a method is provided of making a fiber-reinforced composite laminate stiffener having a length, and a contour along its length. The method includes placing a composite charge on a pair of flexible cauls arranged to form a die cavity therebetween, and forming a composite charge into a desired cross sectional shape by forcing the composite charge into the die cavity. The method also includes constraining the stiffener, including using the flexible cauls to apply pressure to the stiffener. The method further comprises forming the stiffener to the contour using the flexible cauls, including flexing the flexible cauls as the flexible cauls constrain the stiffener while the stiffener is being formed to the contour. Forming the stiffener to the contour is performed at a rate that causes irreversible deformation of the stiffener.

One of the advantages of the disclosed constrained creep forming is that ply wrinkling of a composite laminate stiffener is reduced or eliminated as it is being formed to a desired contour. Another advantage is that stiffeners with more severe contours can be formed with reduced wrinkling. Another advantage is that contoured composite laminate stiffeners may be produced with smooth surface finishes substantially free of mark-off.

The features, functions, and advantages can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and advantages thereof, will best be understood by reference to the following detailed description of an illustrative example of the present disclosure when read in conjunction with the accompanying drawings, wherein:

FIG. 1 is an illustration of a fragmentary, top plan view of a stiffener.

FIG. 2 is an illustration of a sectional view taken along the line 2-2 FIG. 1.

DETAILED DESCRIPTION

Composite laminate stiffeners such as stringers are sometimes contoured along their length to assure proper fitment on structures (not shown) to which they are attached. For example, referring to FIGS. 1 and 2, a composite laminate stiffener 40 (hereinafter referred to as a "stiffener"), which in the illustrated example is a blade stringer, comprises a flat blade 42 and a flange 44 extending perpendicular to the blade 42. The stiffener 40 has a curvature in the curved plane 46 of the flange 44 and may also have a variable thickness at one or more locations along its length in order to conform the stiffener 40 to localized contours of the structure to which it is to be attached.

Figure 3:
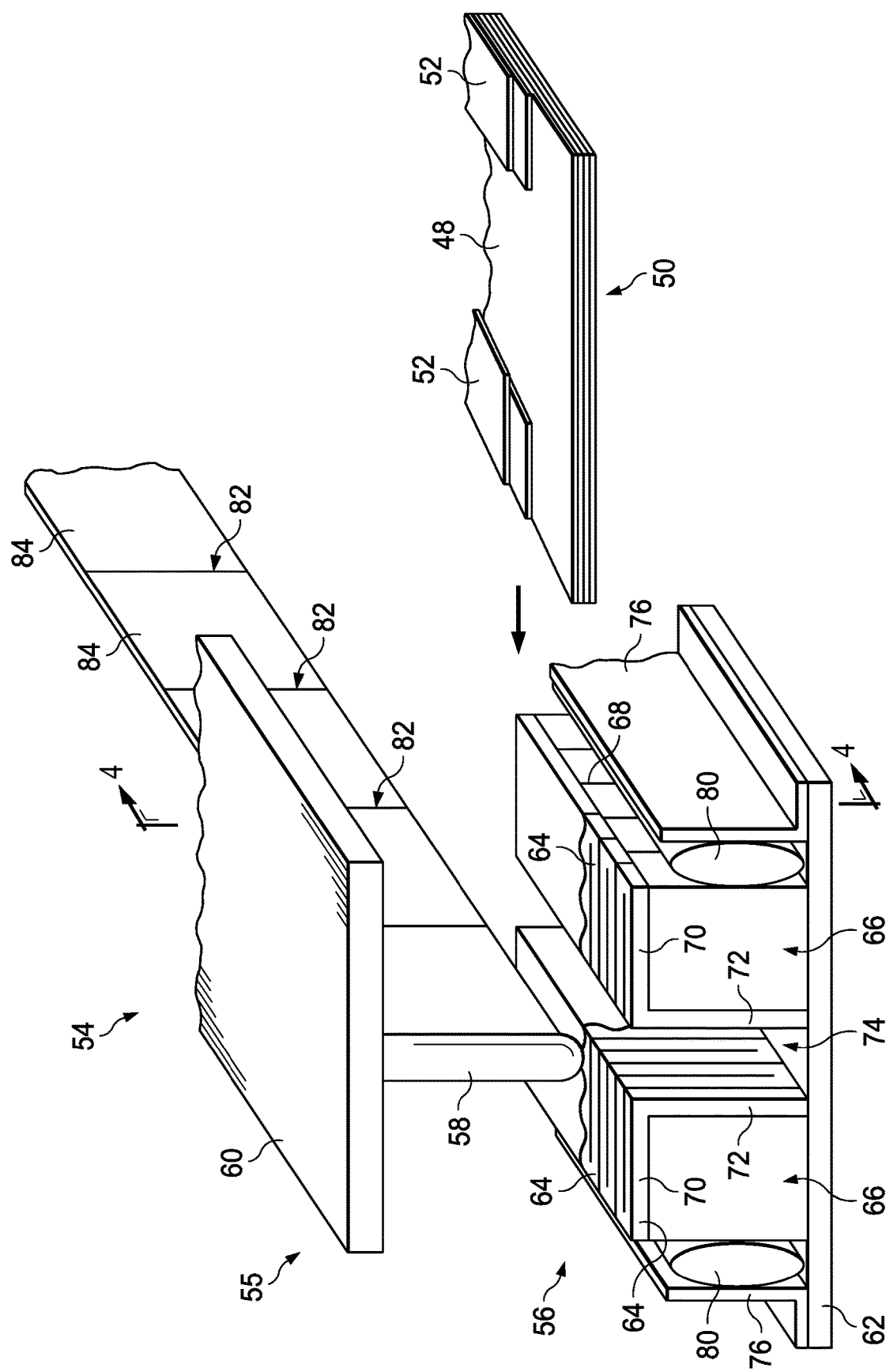
FIG. 3 is an illustration of a fragmentary, perspective view of tooling apparatus used to form the curved stiffener shown in FIGS. 1 and 2.
Figure 4:
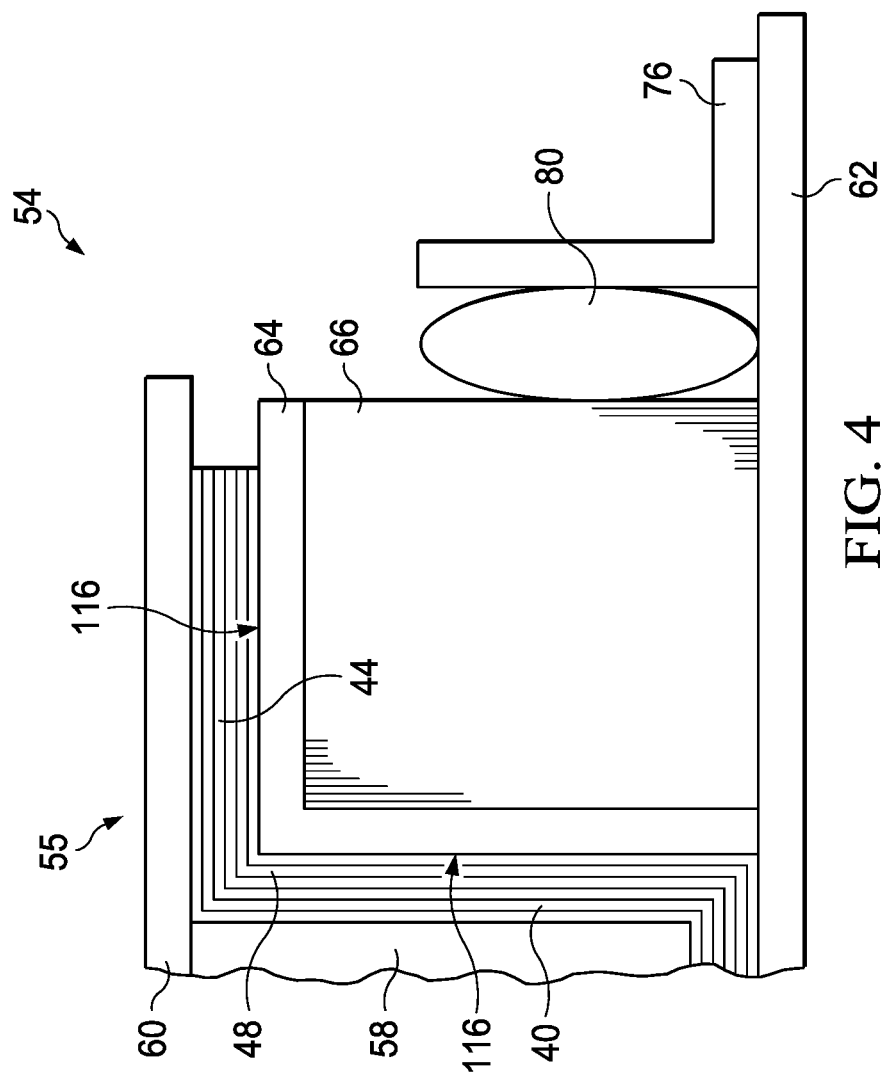
FIG. 4 is an illustration of a sectional view taken along the line 4-4 in FIG. 3, but showing a composite charge having been partially formed into the stiffener.

FIGS. 3 and 4 illustrate one form of tooling apparatus 54 that may be used to form the stiffener 40 using a fiber-reinforced composite charge (hereinafter referred to as a "charge"), which in the illustrated example is generally flat and comprises multiple plies 50 of composite material. The charge 48 may also include pad-up plies 52. The plies 50 may comprise a fiber-reinforced polymer such as, for example and without limitation, a thermoset or thermoplastic reinforced with continuous fibers such as carbon fibers. The tooling apparatus 54 broadly comprises an upper die 55 mounted on an upper flexible plate 60, and a lower die 56 mounted on a lower flexible plate 62. The upper die 55 includes a punch 58 having a blade-like shape that is provided with slits 82 along its length. The slits 82 segment the punch 58 into a plurality of punch portions 84 that allow the punch 58 to flex along its length.

The lower die 56 comprises a pair of the flexible cauls 64 respectively mounted on a pair of die support blocks 66 that are segmented 68 along their lengths. Each of the flexible cauls 64 comprises a flange 70 and a web 72. The flange 70 and the web 72 each have a tool surface 116 that is substantially smooth and continuous along the length of the flexible caul 64. The webs 72 of the flexible cauls 64 are spaced apart from each other to form a die cavity 74 into which the charge 48 can be formed by the punch 58. The die support blocks 66 and flexible cauls 64 are laterally slideable toward and away from each other on the lower flexible plate 62. Segmentation 68 of the die support blocks 66 allows them to flex along their lengths.

A pair of L-shape brackets 76 are mounted on and extend along the length of the lower flexible plate 62, on opposite sides of lower die 56. The L-shape brackets 76 function to both retain the die support blocks 66 on the lower flexible plate 62, and react lateral forming forces generated by the flexible cauls 64. A pair of inflatable hoses 80, sometimes referred to as bags or bladders, are sandwiched between the L-shape brackets 76 and the die support blocks 66, and are adapted to be coupled with a suitable source of pressurized air (not shown). The inflatable hoses 80 may be selectively pressurized in order to apply a lateral force on the flexible cauls 64 through the die support blocks 66 during forming and/or contouring operations. Other mechanisms, however, may be provided to apply lateral force to the die support blocks 66.

As previously mentioned, the stiffener 40 may have a variable flange thickness in localized areas along its length in order to conform the stiffener 40 to local contours of the structure to which it is attached. In order to accommodate these thickness variations so that constant pressure is evenly applied to the composite charge 48 in these localized areas, the webs 72 of the flexible cauls 64 locally flex, as necessary along their length so as to conform to the local contours caused by these thickness variations. Similarly, as the charge 48 is formed to a desired contour, both the flanges 70 and webs 72 of the flexible cauls 64 flex as necessary to maintain a constant forming pressure on the charge 48. Although not shown in the Figures, shims may be placed between the flexible cauls 64 and the die support blocks 66 and/or the upper flexible plate 60 to compensate for the thickness variations.

Figure 5:
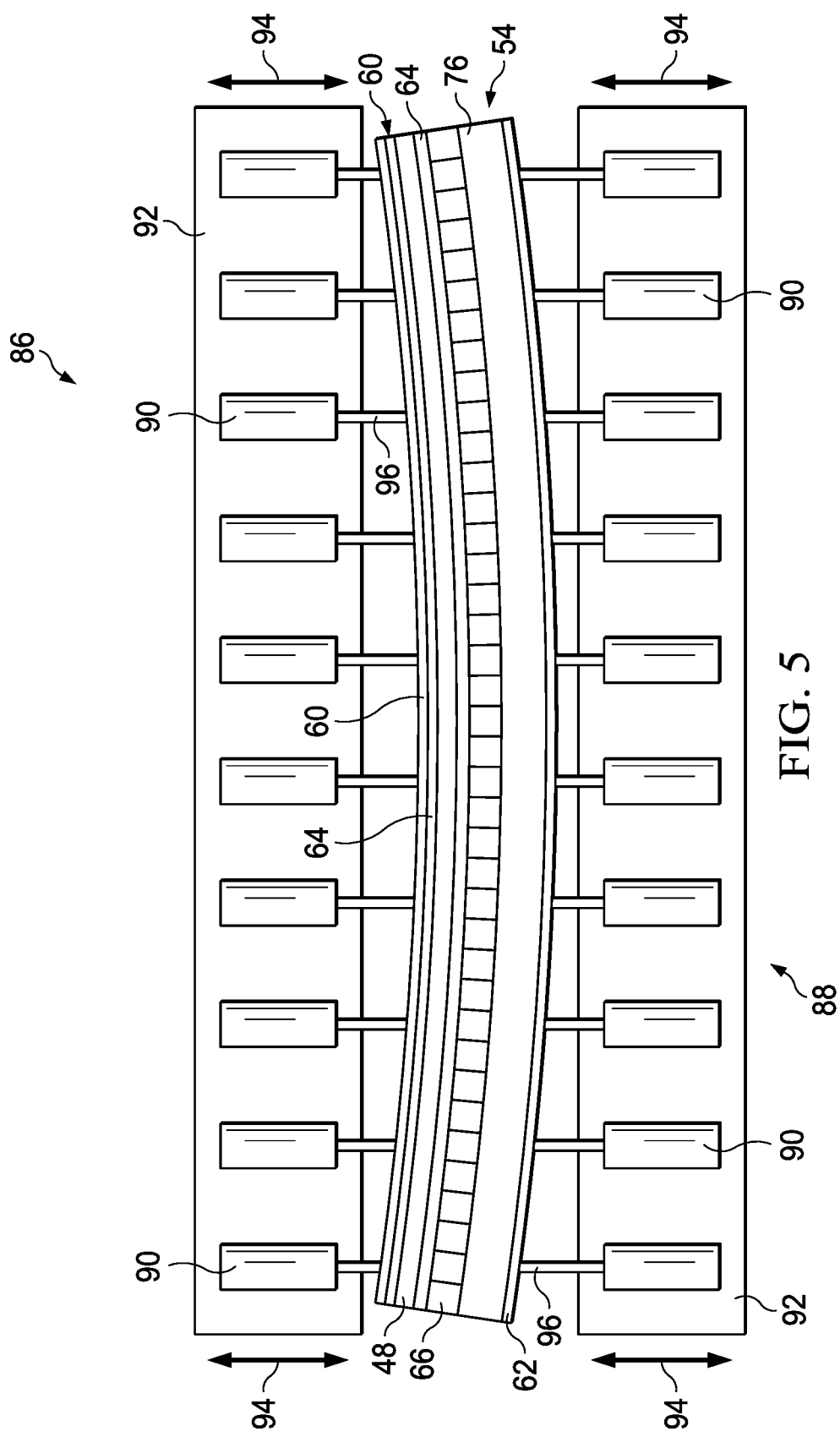
FIG. 5 is an illustration of a plan view of a die and punch contour changing mechanism employing the tooling apparatus shown in FIG. 3.

FIG. 5 illustrates a die and punch contour changing mechanism 86 incorporating the tooling apparatus shown in FIGS. 3 and 4. The die and punch contour changing mechanism 86 may comprise, for example and without limitation, a press 88. A plurality of individual, spaced apart actuators 90 are respectively mounted on opposing press plates 92 that are adapted for movement toward and away from each other, indicated by the arrows 94. The tooling apparatus 54 is disposed between the press plates 92. The press plates 92 may be coupled with any suitable power operated mechanisms such as cylinder actuators (not shown) which displace the press plates 92 to open/close the tooling apparatus 54 during a charge forming operation. Each of the actuators 90 includes a plunger 96 coupled with one of the upper and lower flexible plates 60, 62 that applies a force to the upper and lower flexible plates 60, in order to bend them. Bending the upper and lower flexible plates 60, 62 in turn bends the die support blocks 66 along with the flexible cauls 64, thereby contouring the stiffener 40 along its length. Other mechanisms however, may be employed to longitudinally contour the tooling apparatus.

Figure 6:
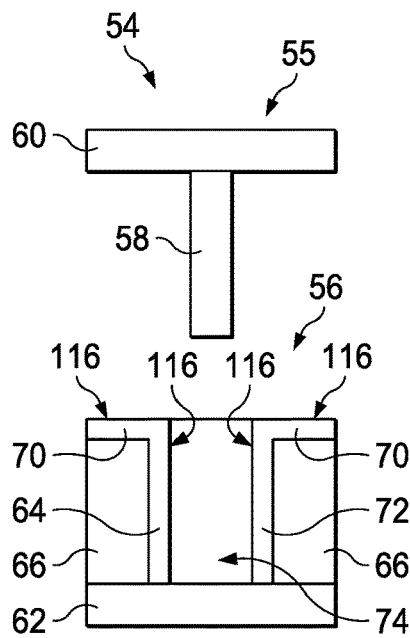
FIG. 6 is an illustration of a diagrammatic view of the tooling apparatus of FIG. 3, with the upper die raised in readiness to begin forming the curved stiffener shown in FIGS. 1 and 2.

Attention is now directed to FIGS. 6-15 which illustrate the sequential steps of a method of producing contoured stiffeners 40 using the tooling apparatus 54 shown in FIGS. 3 and 4. In this illustrated method example, the stiffener 40 being produced is a blade stringer of the type as shown in FIGS. 1 and 2, however, the method may be used to produce any of a wide variety of stiffeners and similar structures, having various cross sectional shapes, and one or more contours and/or thickness variations along their lengths. Referring to FIG. 6, the tooling apparatus 54 is readied for use by installing a pair of the flexible cauls 64 respectively on the die support blocks 66. At this point, the upper die 55 and the lower die 56 are both substantially straight. As will be discussed below in more detail, the flexible cauls 64 are flexible along their respective lengths and have smooth outer tool surfaces 116 that substantially reduce or eliminate mark-off on the stiffener 40 being formed. The flexible cauls 64 function as forming tools for forming the blade 42 and flange 44 of the stiffener 40 shown in FIGS. 1 and 2. The flexible cauls 64 include later discussed features that may assist in reducing potential ply wrinkling when the stiffener 40 is formed to a desired contour along its length.

Figure 7:
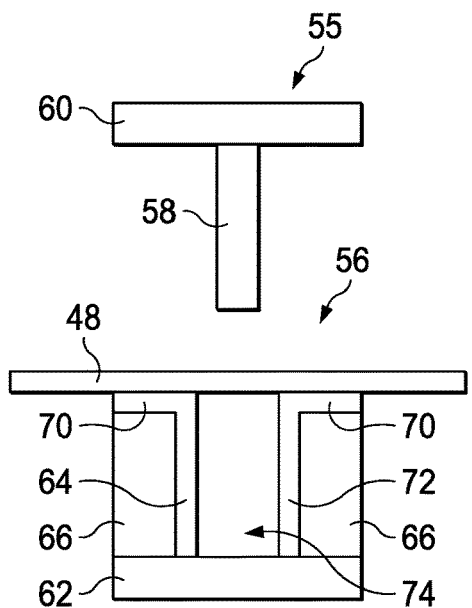
FIG. 7 is an illustration similar to FIG. 6, but showing a composite charge having been placed on the lower die.
Figure 8:
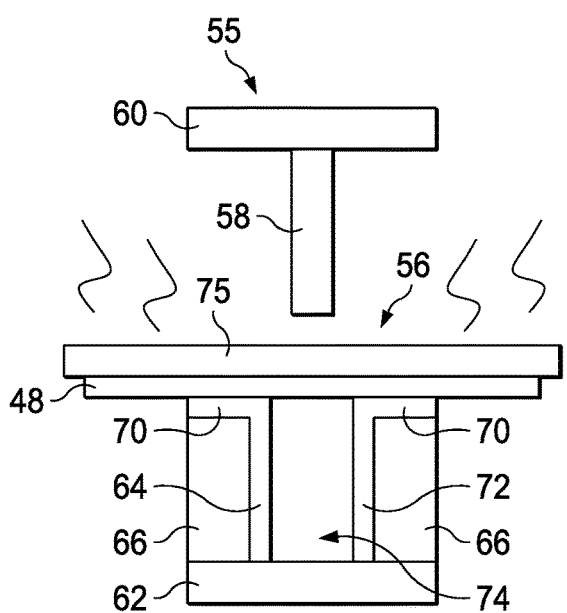
FIG. 8 is an illustration similar to FIG. 7, but showing a heating blanket having been placed on top of the composite charge.
Figure 9:
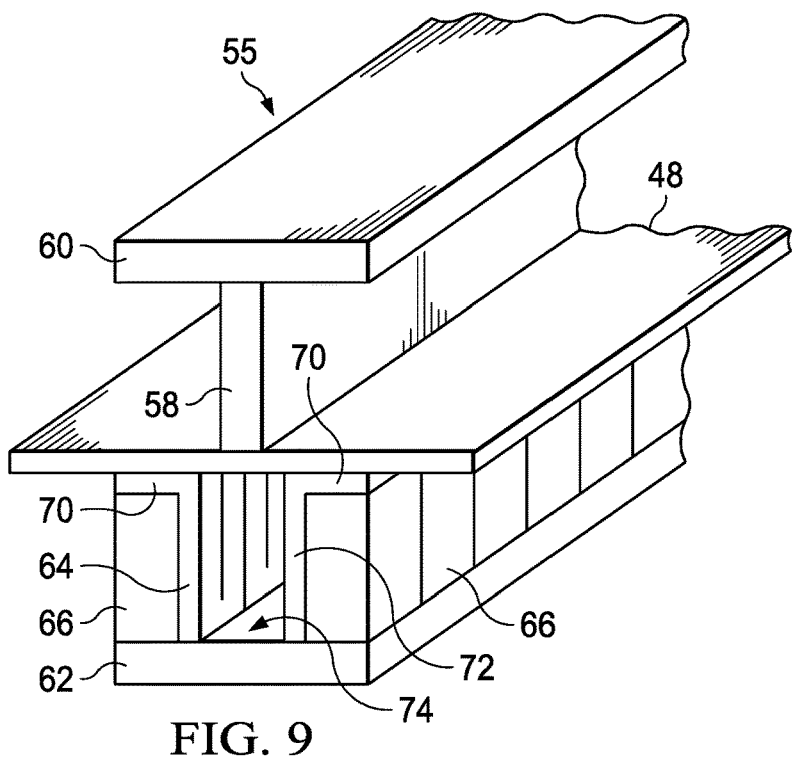
FIG. 9 is an illustration of a fragmentary, perspective view of the tooling apparatus in which the heating blanket has been removed and the upper die has descended into initial contact with the composite charge.

Referring to FIG. 7, a charge 48 is placed on the lower die 56, overlying the flanges 70 of the flexible cauls 64. In this example, the charge 48 is a flat stack of fiber-reinforced plies 50. Although not shown in FIG. 7, the charge 48 may also include one or more pad-up plies 52 (see FIG. 3). Next, as shown in FIG. 8, a heating blanket 75 or similar heating device is placed on top of the charge 48 to heat the charge 48 to a temperature that is suitable for carrying the creep forming process described below. In FIG. 9, the punch 58 is displaced downwardly into contact with the charge 48, and subsequently begins forcing it into the die cavity 74 at a controlled, preselected punch rate. The punch rate will depend on a variety of factors including the temperature to which the charge 48 has been heated, the number of plies 50 in the charge 48, etc.

Figure 10:
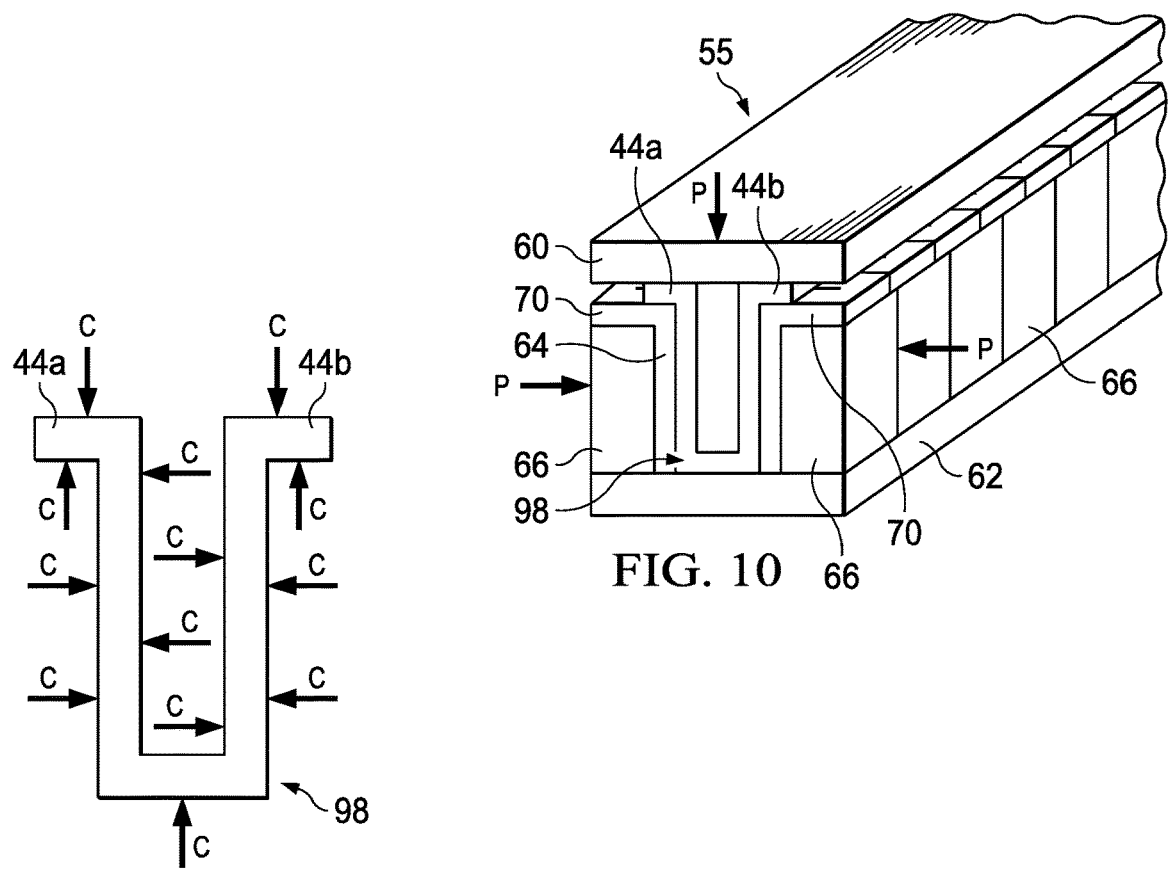
FIG. 10 is an illustration similar to FIG. 9, in which a punch of the upper die has formed the composite charge into the lower die, and the upper and lower dies have constrained the partially formed stringer.

As the charge 48 is forced into the die cavity 74, which is straight at this point in the process, it is formed against the webs 72 of the flexible cauls 64, and down against the lower flexible plate 62. FIG. 10 shows the punch 58 having fully formed a middle portion of the charge 48 into a hat section 98 within the die cavity 74. As the hat section 98 is being formed within the die cavity 74, lateral pressure P is being applied to the die support blocks 66 by the hoses 80 (FIGS. 3 and 4) in order to react the lateral forming forces generated by the punch 58. As the punch 58 descends into the die cavity 74, the upper flexible plate 60 presses outer edges of the charge 48 down against the flanges 70 of the flexible cauls 64, thereby forming the flange portions 44a, 44b of the stiffener 40. At this stage of the process, the stiffener 40 has been partially formed but is not yet contoured along its length.

Figure 11:
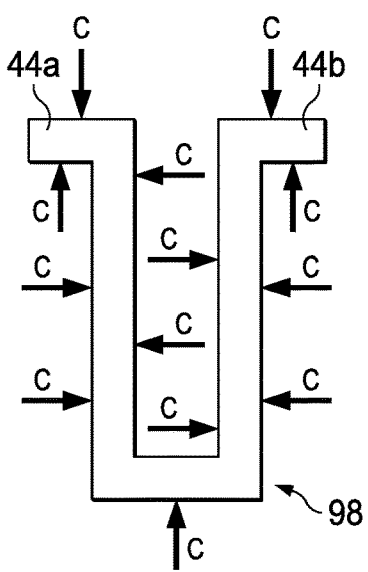
FIG. 11 is an illustration of an end view of the partially formed stiffener shown in FIG. 10, depicting how the tooling apparatus applies pressure to constrain the sides of the stiffener.

Referring simultaneously to FIGS. 10 and 11, when the punch 58 has been forced down fully into the die cavity 74, the flange portions 44a, 44b are fully constrained C by the pressure P applied to them by the upper flexible plate 60, while the hat section 98 is similarly constrained C along its sides by the pressure P that is produced by the hoses 80 and applied to the charge 48 by the die support blocks 66. Thus, the stiffener 40 is fully constrained at this point, and continues to be constrained in this manner until it is formed to its final contour. The total amount of pressure P applied to the flange portions 44a, 44b by the upper flexible plate 60 may be distributed along the length of the upper flexible plate 60. A portion of the pressure P may be applied at individual locations or sections that are spaced apart from each other along the length of the upper flexible plate 60, such as at locations that are 18 to 24 inches apart. The amount of the pressure P applied will depend on the application, and the composition of the charge 48. In some examples, the same amount of pressure P may be applied at each of the locations, while in other examples, the amount of pressure may vary, depending on the location.

Figure 12:
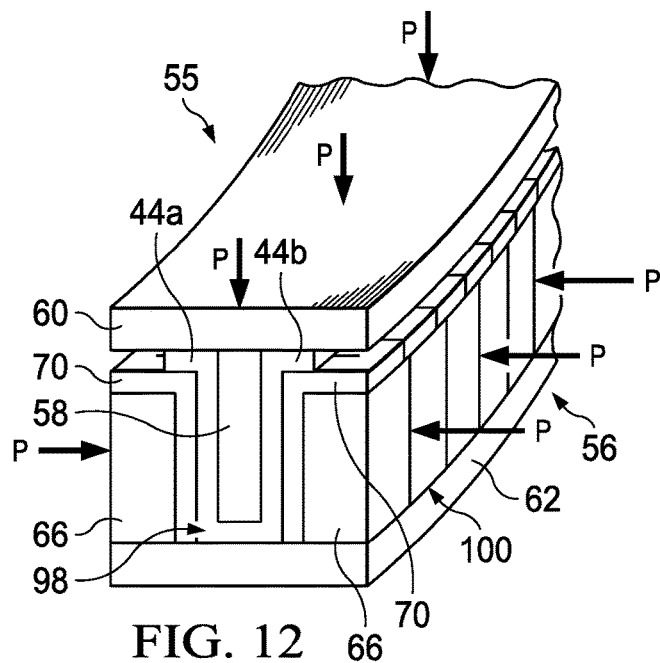
FIG. 12 is an illustration similar to FIG. 10, but wherein the partially formed stiffener has been formed to a desired contour along its length.

Referring now to FIG. 12, with the stiffener 40 constrained on all of its sides, the die and punch contour changing mechanism 86 shown in FIG. 5 is activated to begin the process of contouring 100 the stiffener 40 along its length. As previously explained, the speed and the shape of the contouring 100 are determined by operation of the actuators 90. Extension of the actuators 90 causes local displacement of corresponding portions of the tooling apparatus 54, whose constituent parts flex in response to this displacement. As will be discussed below in more detail, the contouring operation is performed in a manner and under conditions such that any accumulation of ply wrinkles is reduced or eliminated. This manner of contouring will be referred to herein as "constrained creep forming". Additionally, for reasons explained later, the use of the flexible cauls 64 also may contribute to a reduction or elimination of ply wrinkles.

Figure 13:
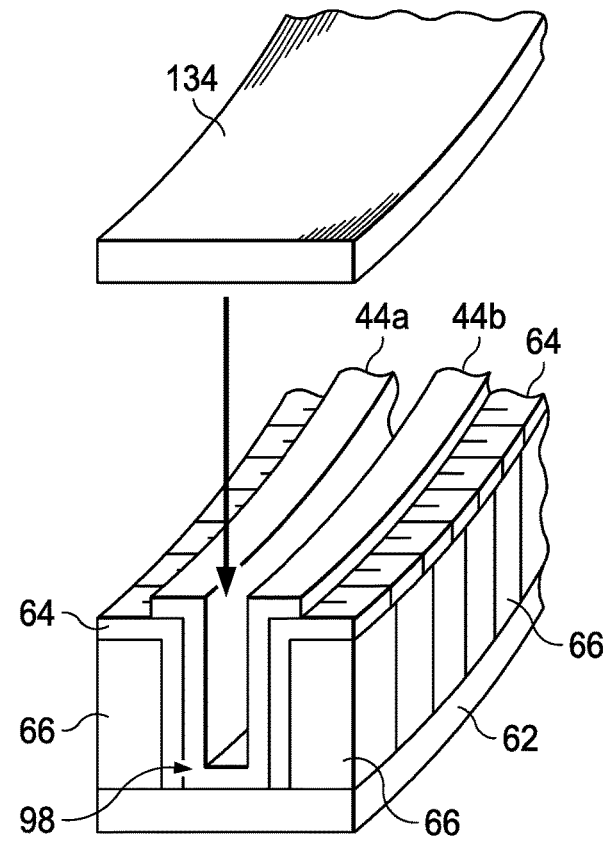
FIG. 13 is an illustration similar to FIG. 12, but showing the upper die having been removed.
Figure 14:
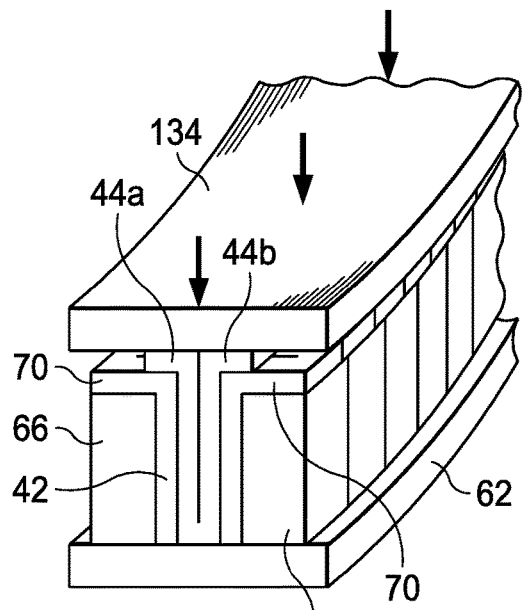
FIG. 14 is an illustration similar to FIG. 13, in which a pressure plate has been installed over the flange portions of the stringer and the hat section has been pressed together to form a blade.
Figure 15:
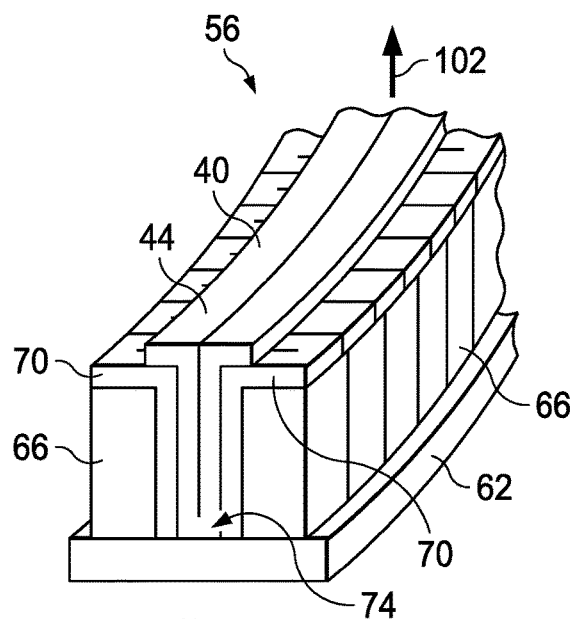
FIG. 15 is an illustration similar to FIG. 14, but showing the pressure plate having been removed and the fully formed stringer ready to be removed from the lower die.

Following contouring of the stiffener 40 by constrained creep forming, the punch 58 is raised, and as is shown in FIG. 13, a pressure plate 134 is placed on top of the exposed flange portions 44a, 44b of the stiffener 40. Next, as shown in FIG. 14, while pressure P is applied to the flange portions 44a, 44b of the stiffener by the pressure plate 134, the lateral pressure P applied by the hoses 80 to the die support blocks 66 is increased which causes the latter to move inwardly toward each other. As the die support blocks 66 move inwardly toward each other, the webs 72 of the flexible cauls 64 squeeze and displace the hat section 98 inwardly until it collapses into the blade 42. Then, as shown in FIG. 15, the pressure plate 134 is lifted away from the lower die 56, allowing removal 102 of the stiffener 40 which is now fully formed and contoured.

Figure 21:
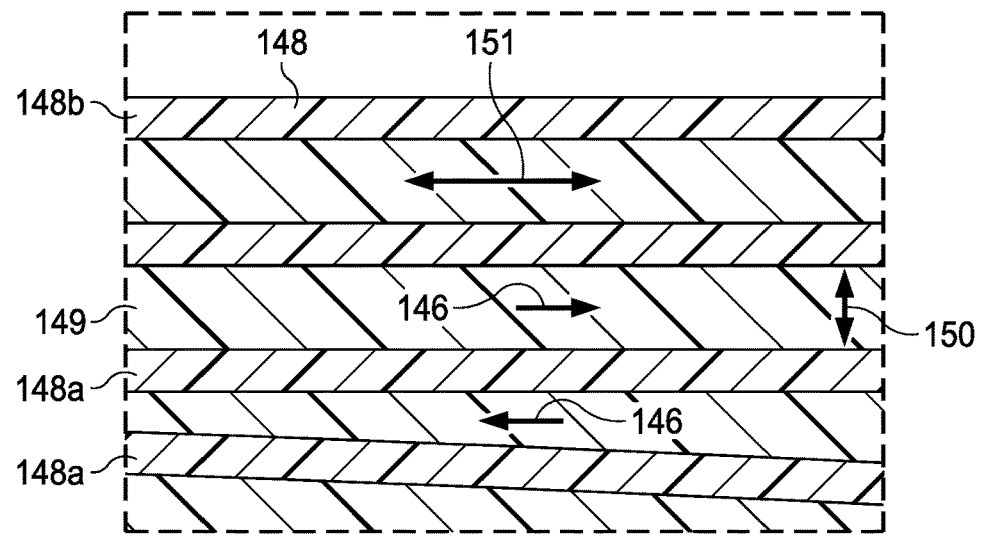
FIG. 21 is an illustration of the area designated as "FIG. 21" in FIG. 20.
Figure 22:
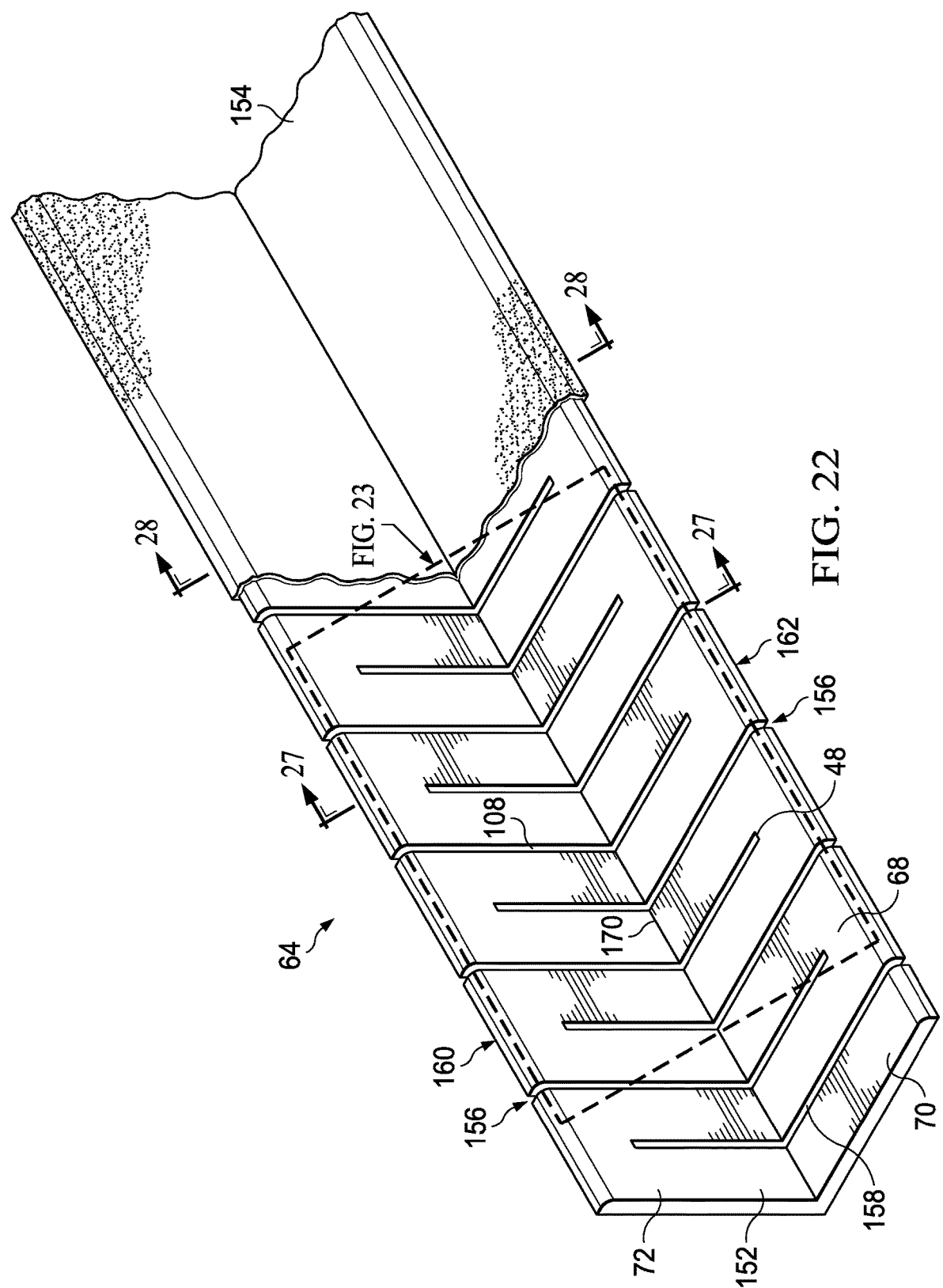
FIG. 22 is an illustration of a fragmentary, perspective view of an alternate example of the flexible caul, sections of the flexible covering being broken away to better reveal features of the caul member.
Figure 23:
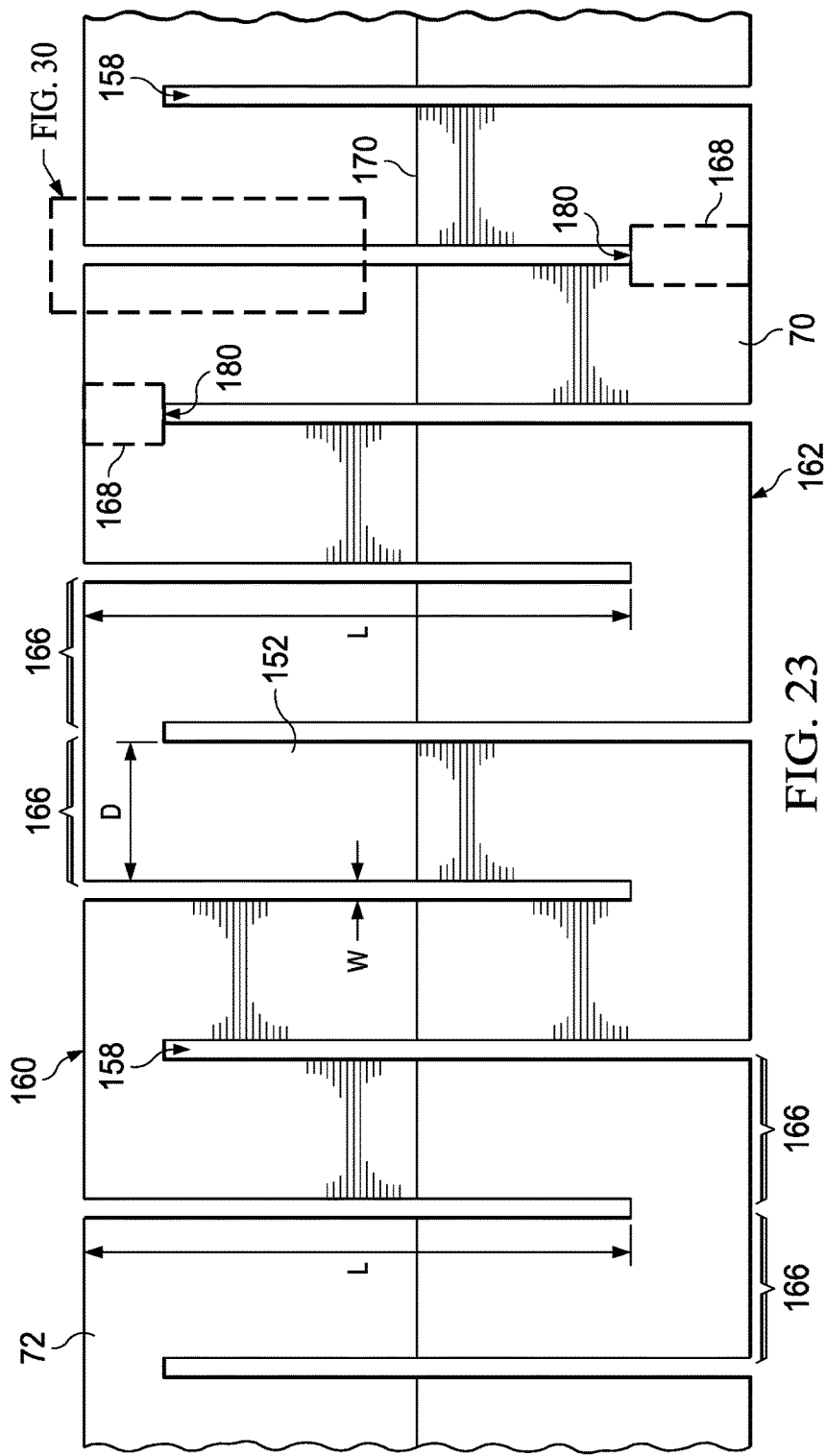
FIG. 23 is an illustration of the area designated as "FIG. 23" in FIG. 22.
Figure 24:
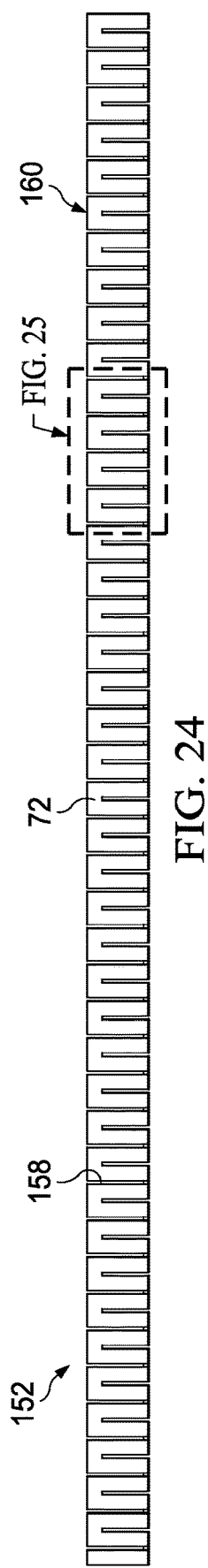
FIG. 24 is an illustration of an elevational view of one side of the caul member forming part of the flexible caul shown in FIG. 22.
Figure 25:
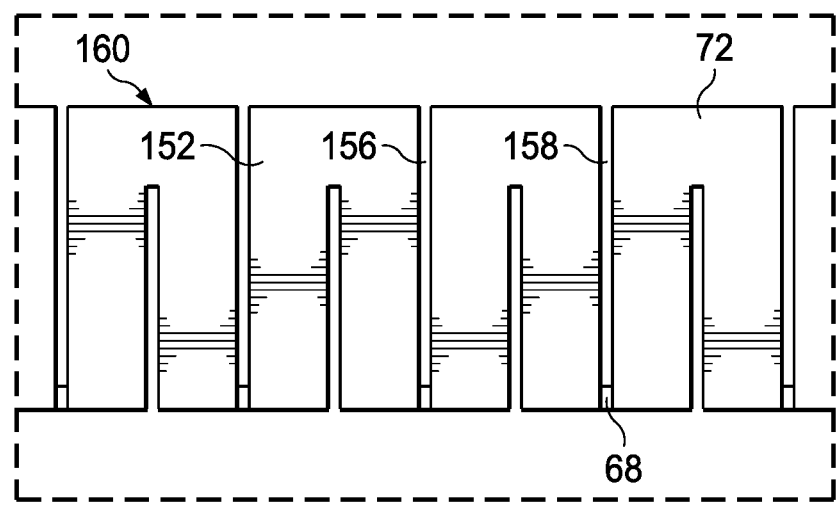
FIG. 25 is an illustration of the area designated as "FIG. 25" in FIG. 24.

As mentioned earlier, the stiffener 40 is formed to the desired contour under conditions and in a manner that allows creep of the materials of which the stiffener is formed. Material creep, also referred to as deformation, in fiber-reinforced composite materials is manifested as a slow irreversible strain produced by a constant load applied over time. Material creep increases as a function of time under a constant load and constant elevated temperature. Composite materials may also undergo relaxation creep when part of the load carried by the polymer matrix (FIG. 21) is transferred to the reinforcing fibers 148, causing incremental extension and permanent deformation and/or relocation of the fibers 148. The effects creep may have on a fiber-reinforced composite structure also may depend in part on the angular orientation of the reinforcing fibers. For example, composite plies 50 may exhibit only relatively slight creep under tension in the direction of the fiber orientation, but greater creep when the load is applied off-axis of the fiber orientation.

Figure 16:
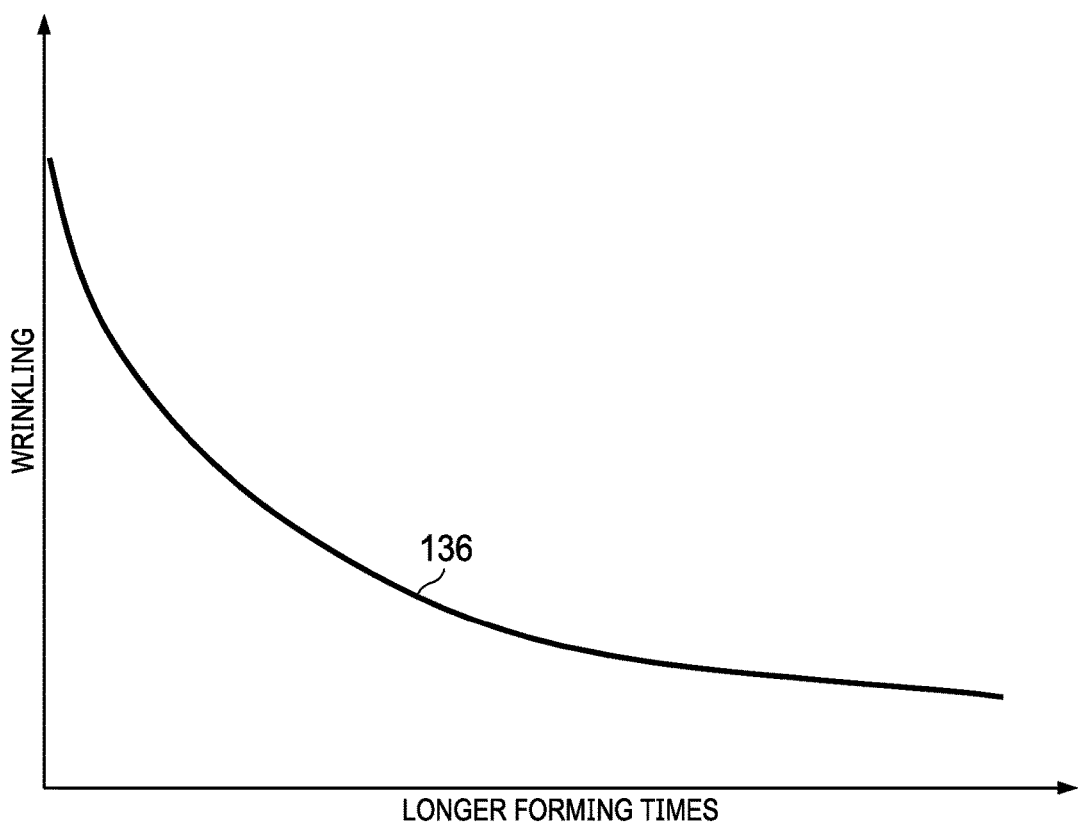
FIG. 16 is an illustration of a graph showing the relationship between stiffener wrinkling and contour forming times.
Figure 17:
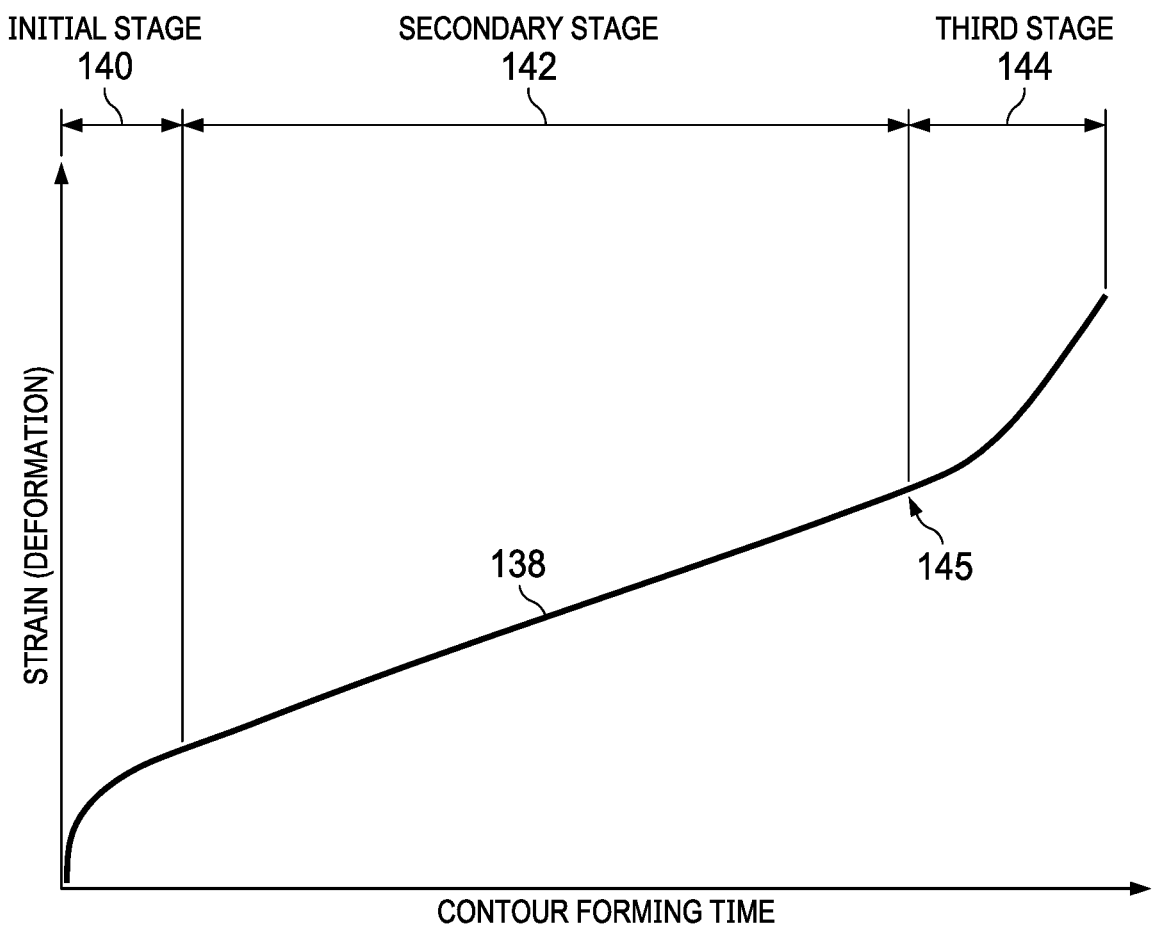
FIG. 17 is an illustration of a graph showing the stages of stiffener strain as a function of contour forming time.
Figure 18:
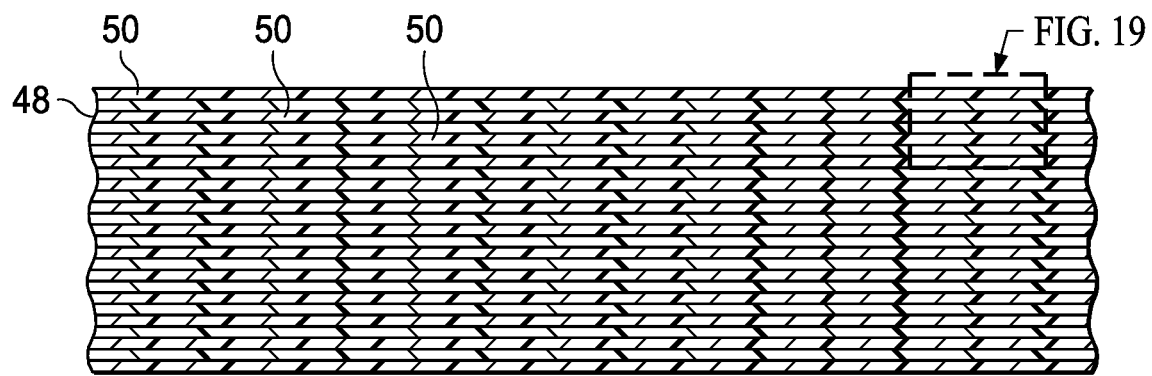
FIG. 18 is an illustration of a sectional view of the composite charge.
Figure 19:
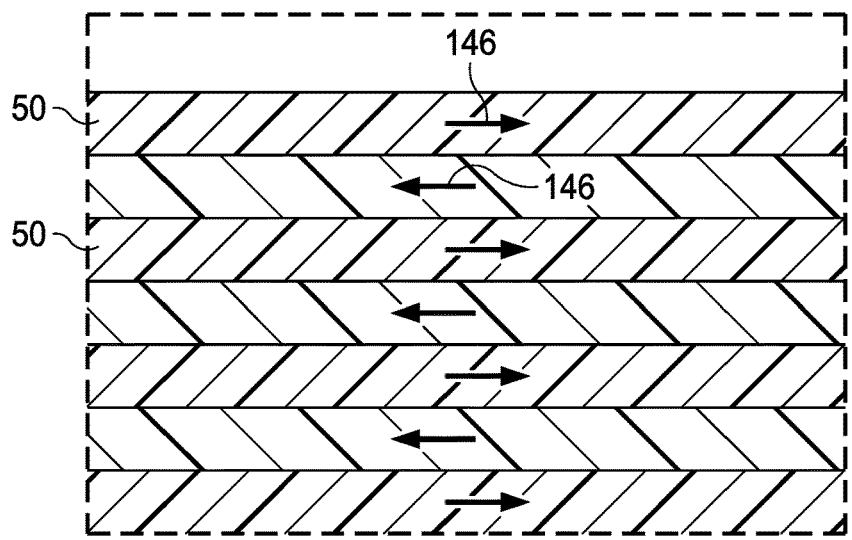
FIG. 19 is an illustration of the area designated as "FIG. 19" in FIG. 18, showing shearing of the plies during constrained creep forming of the stiffener.
Figure 20:
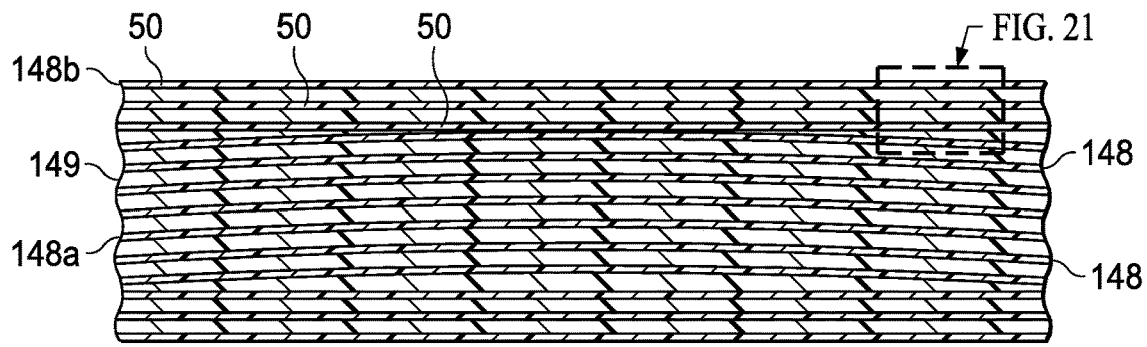
FIG. 20 is an illustration similar to FIG. 18, but showing extension and/or rearrangement of some of the plies resulting from constrained creep forming of the stiffener.

Referring to FIG. 16, potential wrinkling of the stiffener 40 as it is being formed to a desired contour is dependent in part on rate at which the contouring is performed. The curve 136 in FIG. 16 shows that generally, stiffener wrinkling decreases as the contouring process is performed over longer periods of time that allow material creep to occur. The general creep pattern for contouring the stiffener 40 is illustrated by the curve 138 in FIG. 17 which plots permanent strain versus time, while elevated temperature and applied load are held constant. Curve 138 is divided into three segments respectively representing the three stages of creep of the stiffener 40 during contour forming. During the initial stage 140, the stiffener 40 undergoes elastic deformation, the rate of which decreases with time. During the second stage 142, the stiffener 40 undergoes plastic (permanent) deformation at a rate of increase that remains relatively constant up to a transition point 145. Following the transition point 145, during the third stage 144, plastic deformation of the stiffener 40 may increase more rapidly.

The amount wrinkling of the stiffener 40 may be reduced using the disclosed constrained creep forming method will depend upon a variety of factors. These factors include, without limitation, the severity of the stiffener contour, the height of the stiffener 40, the number of plies 50, the polymer used as the matrix, the size, composition and orientation of the reinforcing fibers, the temperature to which the charge 48 is heated prior to forming, the rate at which the stiffener 40 is contoured, and other factors. Generally, however, depending upon the application and the factors mentioned above, the disclosed creep forming of a typical example of multi-ply composite stiffener 40 may be performed at a rate of between 0.0015 inches/second up to approximately 0.006 inches/second. In other examples however, in order to reduce or eliminate ply wrinkling, the creep forming may be performed at a rate faster than 0.006 inches/second or slower than 0.0015 inches/second. Generally, creep forming of the stiffener contour is carried out at a rate that is slow enough such that friction or shear resistance between resin and fibers remains low enough that slippage can occur and significant compression stresses are not generated in order to prevent ply wrinkling.

By way of example, and without limitation, a charge 48 comprising 36 plies of carbon fiber reinforced epoxy that has been punched formed into the cross-sectional shape shown in FIGS. 10 and 11 may be contoured to a relatively severe curvature with minimal or no wrinkling, by constrained creep forming the stiffener 40 at a constant rate of approximately 0.0015 inches/second. In this particular example, the charge 48 is heated to approximately 140° F. to 150° F. Also in this example, the hat section 98 is constrained within the lower die 56 as previously described, while the upper die 55 applies at least approximately 1000 pounds of pressure on the flange portions 44a, 44b of the charge 48 to constrain them during the contour forming process. This applied pressure may be distributed along the length of the stiffener 48, such that a portion of the pressure is applied at locations or sections that are spaced apart along the length of the stiffener 48, as previously described. The particular amount of pressure will vary with the application. In another example where the charge 48 comprises 10 plies of carbon fiber reinforced epoxy and the stiffener 40 is to be formed to a similar severe contour, the constrained creep forming may be performed at a faster rate, for example up to approximately 0.006 inches/second. In both of the examples described above, the charge 48 is initially punched into the die cavity 74 by the upper die 55 at a punch rate of between approximately 0.015 inches/second and 0.030 inches/second.

Attention is now directed to FIGS. 18-21, which diagrammatically illustrate how the plies of the stiffener 40 react to the constrained creep forming described above in a manner that reduces or eliminates ply wrinkling. As constrained creep forming of the stiffener contour is performed at a rate that extends the strain into the second and third stages 142, 144 shown in FIG. 17, the plies 50 as well as the reinforcing fibers 148 may shear 146 relative to each other, resulting in a ply and/or fiber rearrangement that reduces the tendency of the plies 50 to wrinkle. Additionally, constant loading of the charge 48 during constrained creep forming of the stiffener 40 as it is being contoured may cause at least some of the reinforcement fibers 148a held in the polymer matrix 149 of the plies 50 to permanently deform and/or shift 150 in position, thereby further reducing the tendency of the plies 50 to wrinkle during the contour forming process. In addition, stresses in the polymer matrix 149 decrease during the constrained creep forming, causing cause some of the fibers 146b to extend or elongate 151, further reducing the tendency of the plies 50 to wrinkle.

Attention is now directed to FIGS. 22-29, which illustrate additional details of the flexible cauls 64 that are employed as tools to form features of the stiffener 40 with reduced wrinkling using the tooling apparatus 54 previously described. Each of the flexible cauls 64 has an L-shaped cross section and broadly comprises a caul member 152 encased within or covered by a flexible covering 154. The caul member 152 may comprise a substantially rigid material suitable for the application, including but not limited to metals, fiber products and composites to name only a few. In the illustrated example, the caul member 152 is a rigid fiber-reinforced composite laminate which, depending on the geometry of its features and their thicknesses, is capable of some degree of flexing when subjected to bending forces.

The caul member 152 includes a plurality of gaps 156 therein along its length which divide the flexible caul into hinged segments 166 that provide it with flexibility. In the example shown in FIGS. 22 and 23 the gaps 156 comprise slits 158, however other gap geometries are possible. The slits 158 extend from first and second opposite edges 160, 162 respectively inwardly beyond the central longitudinal axis 170 of the caul member 152 and therefore span across both the flange 70 and the web 72 of the caul member 152. The two sets of slits 158 originating from the first and second edges 160, 162 are arranged in alternating relationship to each other. "Alternating relationship" refers to the fact that adjacent ones of the slits 158 originate from different ones of the edges 160, 162. The selection of the length L and width W of the slits 158 and the distance D between them will depend on the particular application, but should be sufficient to allow the caul member 152 to bend or flex to the degree required for the application. In the illustrated example, the slits 158 are regularly spaced from each other and have the same lengths L and widths W, however, in other examples the slits 158 may be spaced irregularly and have differing lengths L and widths W.

The slits 158 extend parallel to each other in the illustrated example, however in other examples they may not be parallel to each other in order to meet the requirements of the particular application. The slits 158 terminate at end points 180 (FIG. 23) that are spaced from adjacent ones of the first and second edges 160, 162. The segments 166 are hinged together at flexible zones 168 located at the ends of the slits 158. Each of the flexible zones 168 effectively forms a flexure bearing, sometimes commonly referred to a living hinge, in which the hinge material is made from the same two rigid pieces that it connects.

Figure 26:
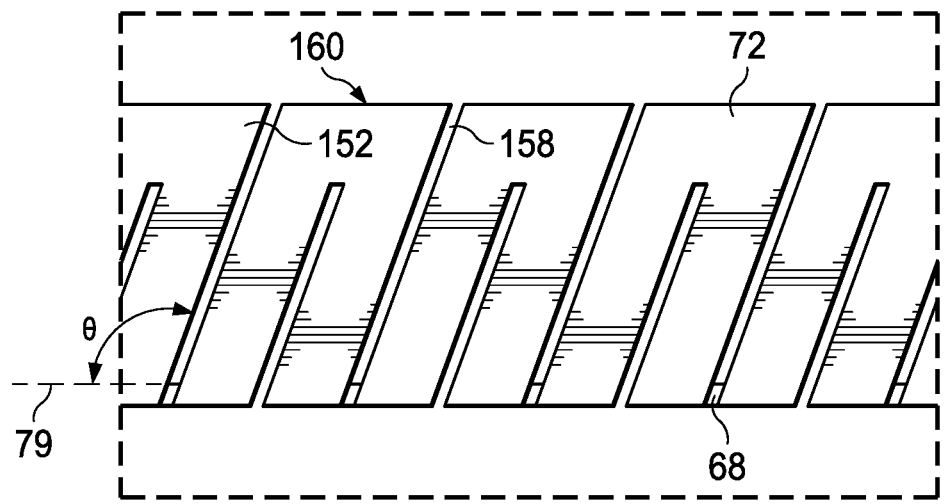
FIG. 26 is an illustration similar to FIG. 25, but showing another example the caul member in which the slits are oriented off-axis.
Figure 27:
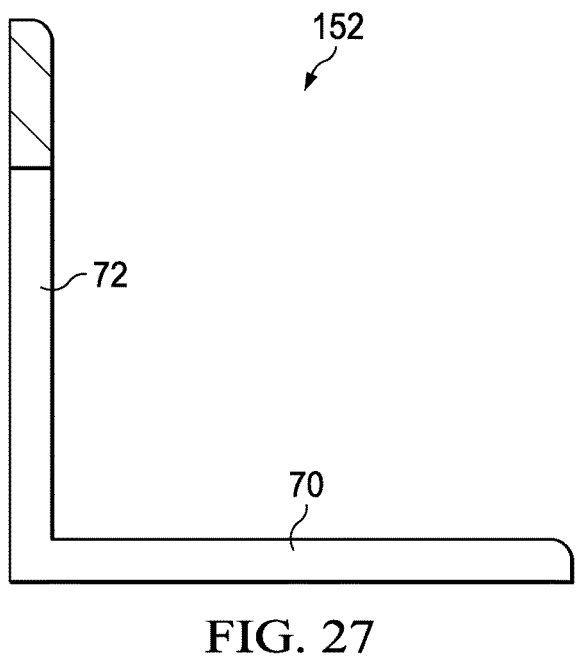
FIG. 27 is an illustration of a sectional view taken along the line 27-27 in FIG. 22.
Figure 28:
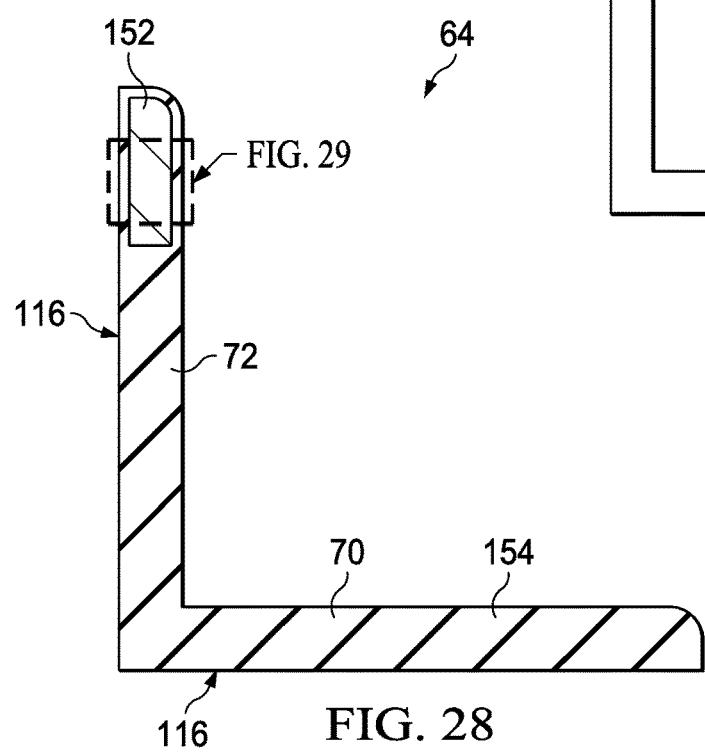
FIG. 28 is an illustration of a sectional view taken along the line 28-28 in FIG. 22.
Figure 29:
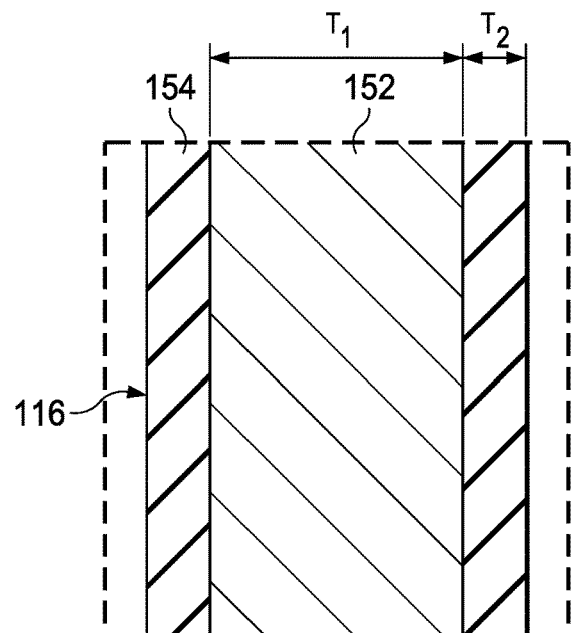
FIG. 29 is an illustration of the area designated as "FIG. 29" in FIG. 28.

While the slits 158 extend substantially perpendicular to the central longitudinal axis 170 of the caul member 152 in the illustrated example, they may be oriented off-axis at any angle that best suits the requirements of a particular application. For example, since potential ply wrinkles tend to be formed perpendicular to the central longitudinal axis 170 of the flexible caul 64, an off-axis orientation of the slits 158 such that the slits 158 do not line-up to be parallel with the wrinkles, reduces possible build-up of ply wrinkling. As shown in FIG. 26, some or all of the slits 158 may be oriented at an angle θ relative to the central longitudinal axis 170 of the caul member 152. This off-axis orientation of the slits 158 may increase the areal slit coverage of caul member 152 which increases its flexibility, while avoiding parallel alignment of the slits 158 with the orientation of undesired ply deformation that may lead to higher levels of wrinkling. Moreover, the angular orientation of the slits 158 may vary along the length of the caul member 152 in order to suit the requirements of a particular application, such as to reduce localized accumulations of ply wrinkling as the stiffener 40 is being formed to a desired contour.

The flexible covering 154 may comprise a suitable elastomer that is capable of adhering to the surfaces of the caul member 152 and remains flexible without degradation when subjected to the processing temperatures encountered in the particular application. By way of example, and without limitation, the flexible covering 154 may comprise a material combination of tetrafluoroethylene and propylene, such as AFLAS®. The flexible covering 154 fills the slits 158 and effectively forms hinges between the segments 166, which along with the flexible zones 168 between the segments 166, allow the flexible caul 64 to flex and bend with multiple degrees of freedom. Furthermore, the flexible covering 154 also prevents the flexible caul 64 from over-flexing which may otherwise render the flexible caul 64 difficult to handle and manipulate. The flexible covering 154 fills the slits 158 to provide the flexible caul 64 with tool surfaces 116 (FIGS. 28 and 29) that are substantially smooth and continuous throughout the length of the flexible caul 64. The tool surfaces 116 formed by the flexible covering 154 assist in assuring that even forming pressure is applied to the charge 48, while also reducing or eliminating potential mark-off on the finished composite part that might otherwise be caused by the openings formed by the slits 158. The thickness $T_1$ (FIG. 29) of the flexible covering 154 relative to the thickness $T_2$ of the caul member 152 will depend upon the particular application.

Figure 32:
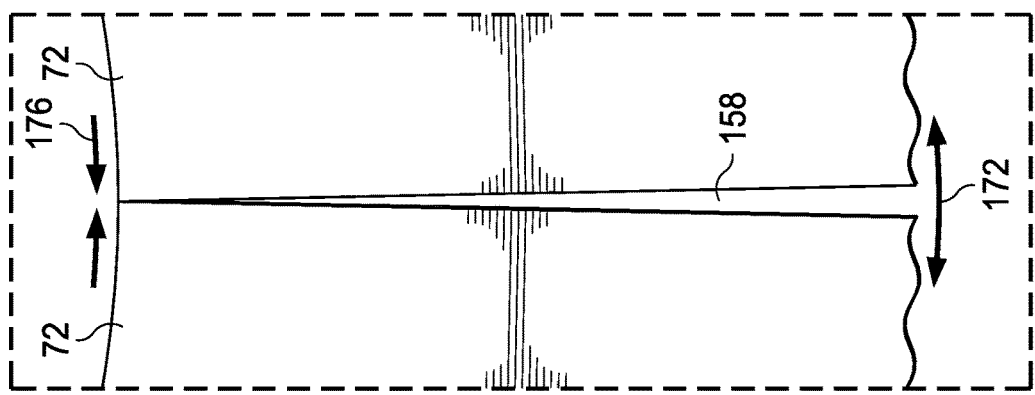
FIGS. 31 and 32 are illustrations similar to FIG. 30 but showing changes in the geometry of a slit due to flexing of the caul member.
Figure 31:
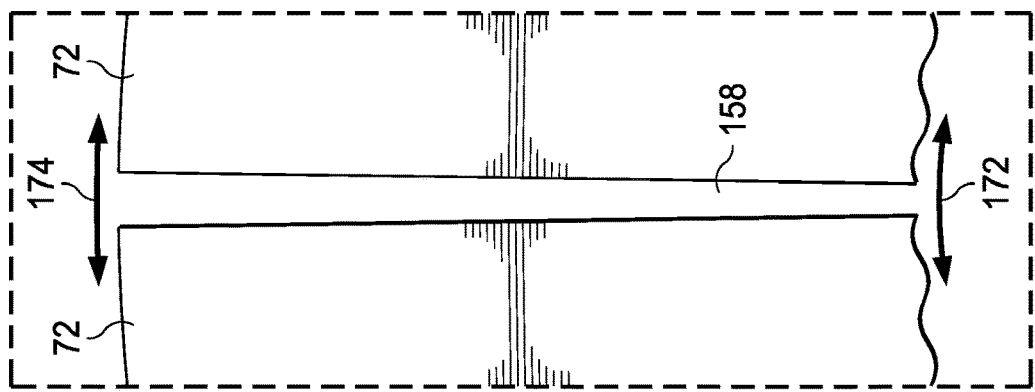
Figure 30:
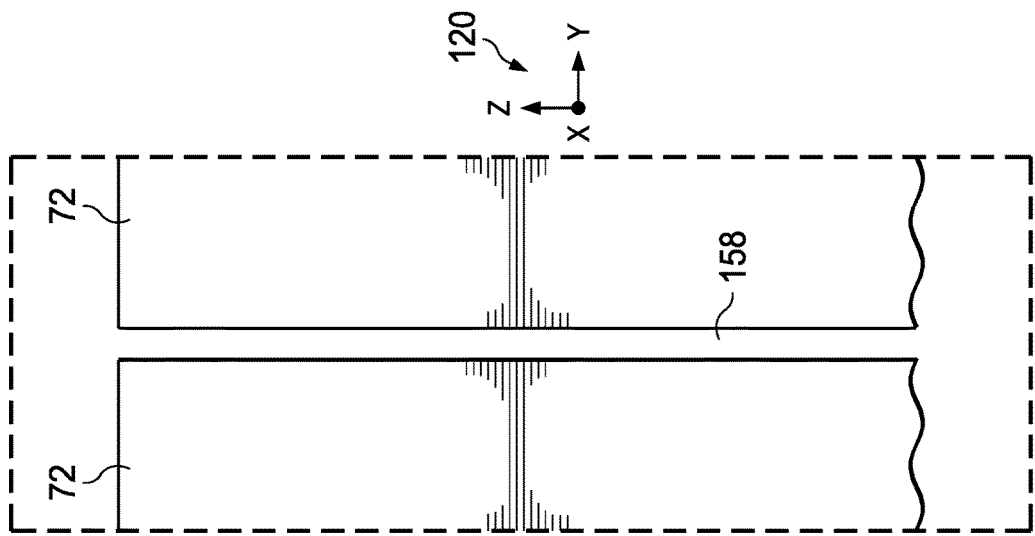
FIG. 30 is an illustration of the area designated as "FIG. 30" in FIG. 23, prior to the caul member being flexed.

Referring to FIGS. 30-32, bending, flexing and/or twisting of the flexible caul 64 in multiple planes is facilitated by opening or closing (widening or narrowing) of the slits 158. For example, when the flexible caul 64 bends or flexes 172 in one direction within the YZ plane of the coordinate system 120 shown in FIG. 30, the slits 158 in the web 72 and/or the flange 70 may spread open 174 (FIG. 31), while bending or flexing 172 in the opposite direction may cause the slits 158 to close 176 (FIG. 32).

Principles of the disclosed examples may be employed to fabricate flexible cauls 64 having any of a variety of cross sectional shapes such as, without limitation, a hat shape, a C shape, an inverted T shape, a Z shape, an I-shape, or an inverted J shape), to name only a few (all not shown in the Figures).

The flexible caul 64 may be produced by any of a variety of techniques, depending upon its composition. In one example, the caul member 152 may be fabricated by laying up, forming, and curing plies of prepreg, which may comprise, for example and without limitation, a fiber-reinforced thermoset or thermoplastic. The gaps 156 in the caul member 152 may be formed by sawing, cutting or molding. The caul member 152 may be surrounded or encased with the flexible covering 154 by spraying, dipping, insert-molding or other techniques.

Figure 33:
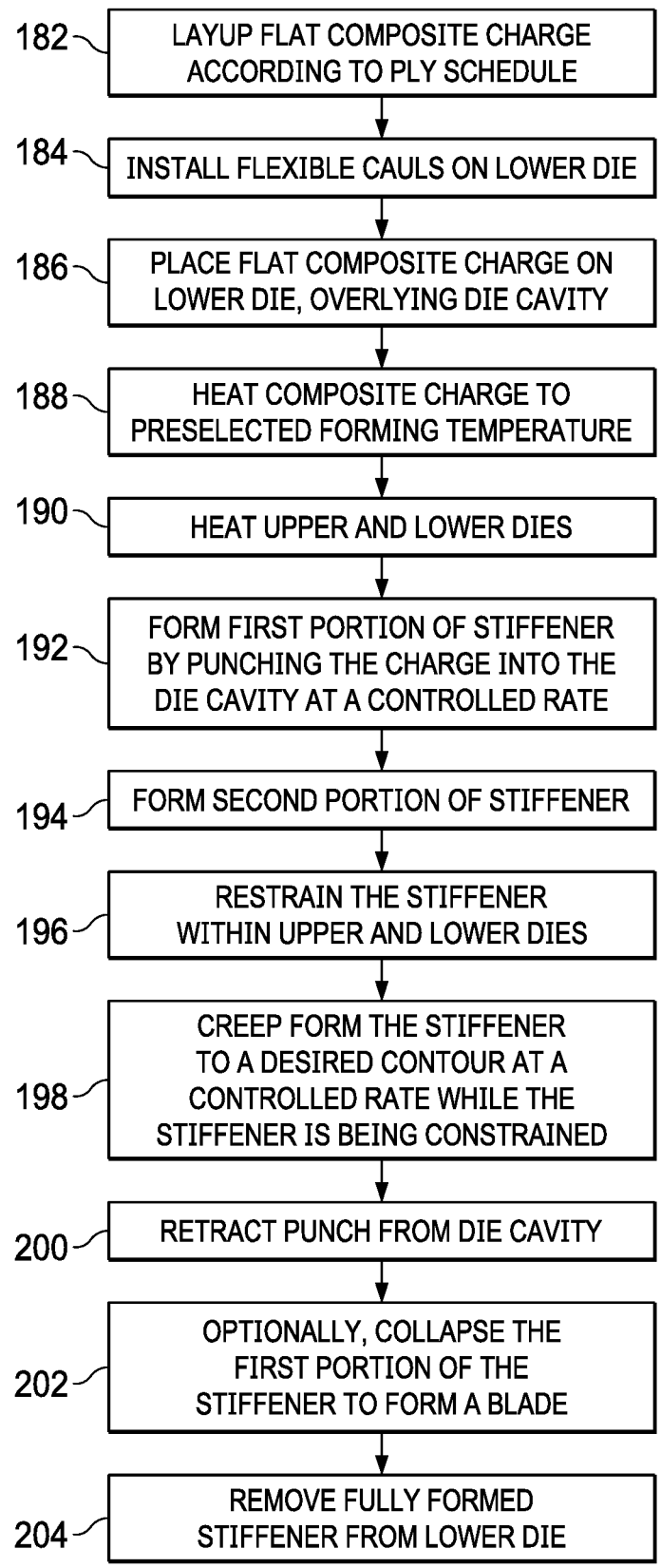
FIG. 33 is an illustration of a flow diagram of a method of making a contoured composite laminate stiffener using constrained creep forming.

Attention is now directed to FIG. 33, which broadly illustrates the steps of a method of making a contoured composite laminate stiffener 40 having reduced wrinkling. Beginning at 182, a composite charge 48 is laid up according to a predetermined ply schedule. Then, at 184, flexible cauls 64 are installed on a lower die 56 of tooling apparatus 54. At 186, the charge 48 is placed on the lower die 56, overlying a die cavity 74 between the flexible cauls 64. At 188, the composite charge 48 is heated to a preselected forming temperature that is suitable for carrying out strained creep forming. At 190, upper and lower dies 55, 56 are heated. At 192, a first portion of the stiffener 40, such as a hat section 98 is formed by punching the composite charge 48 into the die cavity 74 at a controlled, preselected punch rate.

Depending upon the cross sectional shape of the stiffener 40, at 194 a second portion of the stiffener 40 such as flange portions 44a, 44b may be formed. At 196, the stiffener 40 is restrained between the upper and lower dies 55, 56, as by using the upper and lower dies 55, 56 to apply pressure to all sides of the stiffener 40. At 198, the stiffener 40 is creep formed to the desired contour at a controlled rate while it is being constrained on all sides between the upper and lower dies 55, 56. At 200, the punch 58 is retracted from the die cavity 74. Optionally, at 202, the first portion (e.g. hat section 98) of the stiffener 40 may be collapsed in order to form a stiffener blade 42. Finally, at 204, the fully formed stiffener 40 is removed from the lower die 56.

Figure 34:
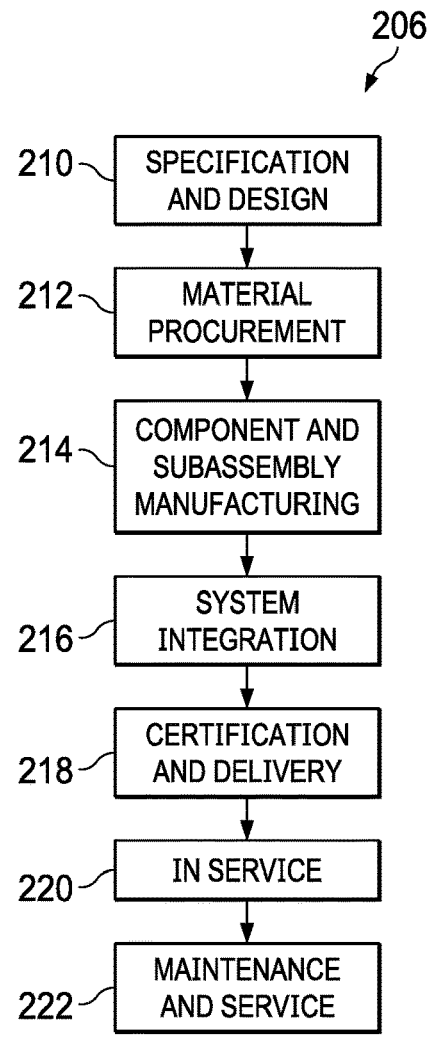
FIG. 34 is an illustration of a flow diagram of aircraft production and service methodology.
Figure 35:
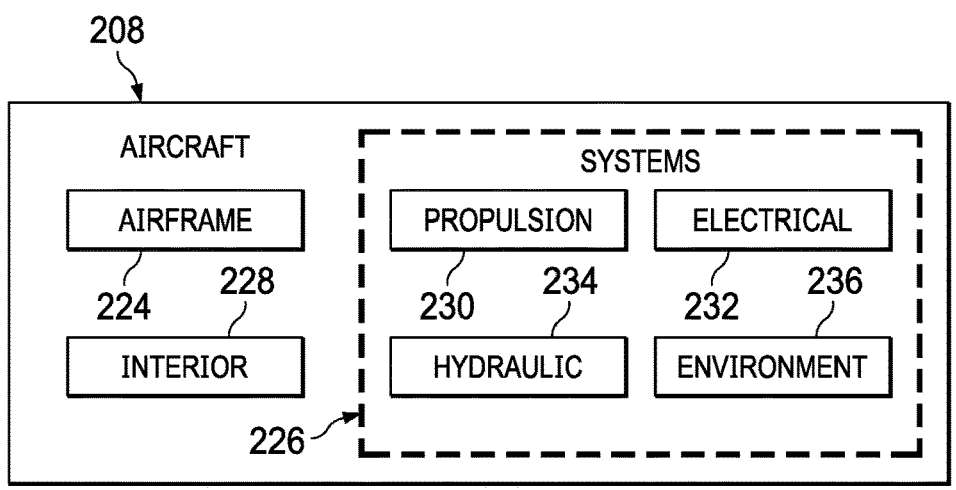
FIG. 35 is an illustration of a block diagram of an aircraft.

Examples of the disclosure may find use in a variety of potential applications, particularly in the transportation industry, including for example, aerospace, marine, automotive applications and other application where pressurized fluid tubes, such as fuel systems and hydraulic systems in aircraft, may be used. Thus, referring now to FIGS. 34 and 35, examples of the disclosure may be used in the context of an aircraft manufacturing and service method 206 as shown in FIG. 34 and an aircraft 208 as shown in FIG. 35. Aircraft applications of the disclosed examples may include a variety of composite parts and structures that have contours, curvatures, varying thicknesses or other non-uniformities along their lengths. During pre-production, exemplary method 206 may include specification and design 210 of the aircraft 208 and material procurement 212. During production, component and subassembly manufacturing 214 and system integration 216 of the aircraft 208 takes place. Thereafter, the aircraft 208 may go through certification and delivery 218 in order to be placed in service 220. While in service by a customer, the aircraft 208 is scheduled for routine maintenance and service 222, which may also include modification, reconfiguration, refurbishment, and so on.

Each of the processes of method 206 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 35, the aircraft 208 produced by exemplary method 206 may include an airframe 224 with a plurality of systems 226 and an interior 228. Examples of high-level systems 226 include one or more of a propulsion system 230, an electrical system 232, a hydraulic system 234 and an environmental system 236. Any number of other systems may be included. Although an aerospace example is shown, the principles of the disclosure may be applied to other industries, such as the marine and automotive industries.

Systems and methods embodied herein may be employed during any one or more of the stages of the aircraft manufacturing and service method 206. For example, components or subassemblies corresponding to production process 214 may be fabricated or manufactured in a manner similar to components or subassemblies produced while the aircraft 208 is in service. Also, one or more apparatus examples, method examples, or a combination thereof may be utilized during the production processes 214 and 216, for example, by substantially expediting assembly of or reducing the cost of an aircraft 208. Similarly, one or more of apparatus examples, method examples, or a combination thereof may be utilized while the aircraft 208 is in service, for example and without limitation, to maintenance and service 222.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples may provide different advantages as compared to other illustrative examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method of making a contoured composite laminate stiffener, comprising:
   placing a composite charge on a die having a die cavity;
   heating the composite charge;
   producing a partially formed stiffener having a length and a cross-sectional shape by forcing the composite charge into the die cavity;
   fully constraining all surfaces of the cross-sectional shape of the partially formed stiffener; and
   creep forming the partially formed stiffener to a desired contour along the length while the partially formed stiffener is being fully constrained.

2. The method of claim 1, wherein creep forming the partially formed stiffener is performed at a rate between approximately 0.0015 inches/second and approximately 0.006 inches/second.

3. The method of claim 1, wherein the partially formed stiffener has sides and fully constraining all the surfaces of the cross-sectional shape of the partially formed stiffener includes applying a pressure to each of the sides.

4. The method of claim 3, wherein the partially formed stiffener includes flange portions and fully constraining all the surfaces of the cross-sectional shape of the partially formed stiffener includes pressing the flange portions against the die.

5. The method of claim 3, wherein:
   forcing the composite charge into the die cavity is performed using a punch to punch the composite charge into the die cavity, and
   applying the pressure to each of the sides is performed by using the die and the punch to apply the pressure.

6. The method of claim 1, wherein:
   fully constraining all the surfaces of the cross-sectional shape of the partially formed stiffener is performed using a pair of flexible cauls, and
   creep forming the partially formed stiffener is performed using the pair of flexible cauls and includes flexing the pair of flexible cauls to the desired contour.

7. The method of claim 1, wherein:
   the composite charge comprises a polymer containing reinforcement fibers, and
   creep forming the partially formed stiffener to the desired contour is performed at a rate that allows the reinforcement fibers to permanently deform.

8. A method of making a contoured fiber-reinforced composite laminate stiffener with reduced wrinkling, comprising:
   placing a fiber-reinforced composite charge between an upper die and a lower die having a die cavity;
   heating the fiber-reinforced composite charge;
   producing a stiffener having a desired cross-sectional shape by forcing the fiber-reinforced composite charge into the die cavity using the upper die;
   fully constraining all surfaces of the cross-sectional shape of the stiffener by using the upper die and the lower die to apply pressure to the stiffener; and creep forming the stiffener to a contour while fully constraining the stiffener using the upper die and the lower die, wherein creep forming the stiffener to the contour produces residual stresses in the stiffener, and creep forming the stiffener to the contour is performed at a rate that allows relaxation of the residual stresses.

9. The method of claim 8, wherein the stiffener has sides and fully constraining all the surfaces of the cross-sectional shape of the stiffener includes constraining the sides while creep forming the stiffener to the contour.

10. The method of claim 8, wherein creep forming the stiffener to the contour includes contouring the upper die and the lower die.

11. The method of claim 8, wherein fully constraining all the surfaces of the cross-sectional shape of the stiffener includes using the upper die to apply pressure to portions of the stiffener at spaced apart locations along a length of the stiffener while creep forming the stiffener to the contour.

12. The method of claim 8, wherein the rate is between approximately 0.0015 inches/second and approximately 0.006 inches/second.

13. The method of claim 8, wherein:
the lower die comprises a pair of flexible cauls and fully constraining all the surfaces of the cross-sectional shape of the stiffener is performed using the pair of flexible cauls, and
creep forming the stiffener is performed using the pair of flexible cauls as forming tools.

14. The method of claim 8, wherein:
forcing the fiber-reinforced composite charge into the die cavity is performed using a punch on the upper die, and
fully constraining all the surfaces of the cross-sectional shape of the stiffener includes using the upper die to apply pressure to the fiber-reinforced composite charge.

15. A method of making a fiber-reinforced composite laminate stiffener having a length and a contour along its length, comprising:
placing a composite charge on a pair of flexible cauls arranged to form a die cavity therebetween;
heating the composite charge;
forming the composite charge into a stiffener having a desired cross-sectional shape by forcing the composite charge into the die cavity;
fully constraining all surfaces of the cross-sectional shape of the stiffener, including using the pair of flexible cauls to apply pressure to the stiffener; and
creep forming the stiffener to the contour using the pair of flexible cauls, including flexing the pair of flexible cauls as the pair of flexible cauls constrain the stiffener while creep forming the stiffener to the contour,
wherein creep forming the stiffener to the contour is performed at a rate causing irreversible deformation of the stiffener.

16. The method of claim 15, wherein:
forcing the composite charge into the die cavity is performed using a punch, and
fully constraining all the surfaces of the cross-sectional shape of the stiffener includes using the punch to apply pressure to at least a portion of the stiffener.

17. The method of claim 16, wherein using the punch to apply pressure to the stiffener includes applying the pressure at spaced apart locations along the length of the stiffener.

18. The method of claim 15, further comprising:
installing the pair of flexible cauls on die support blocks, and
wherein creep forming the stiffener to the contour includes bending the pair of flexible cauls and the die support blocks to the contour.

19. The method of claim 15, further comprising:
using the pair of flexible cauls to change the desired cross-sectional shape of the stiffener after creep forming the stiffener to the contour.

20. The method of claim 15, wherein the rate is between approximately 0.0015 and approximately 0.006 inches/second.

* * * * *